3,694,156
PREPARATION OF Si
James O. Huml, Leigh B. Bangs, and Gilbert S. Layne, Midland, Mich., assignors to The Dow Chemical Company, Midland, Mich.
No Drawing. Continuation-in-part of abandoned application Ser. No. 798,174, Feb. 10, 1969. This application Oct. 19, 1970, Ser. No. 82,150
Int. Cl. C01b *33/02;* B01j *17/00*
U.S. Cl. 423—349             2 Claims

ABSTRACT OF THE DISCLOSURE

A process is provided for producing pure Si or Ge in powdered form. A solid mixture of Si or Ge and a sulfide is contacted with a sulfide dissociating reagent which selectively reacts with the sulfide compound to form at least two physical phases comprising powdered Ge or Si and a fluid phase, gaseous and/or liquid, and the phases are separated from each other.

CROSS-REFERENCE TO RELATED APPLICATION

This is a continuation-in-part application of patent application Ser. No. 798,174, filed Feb. 10, 1969 now abandoned.

BACKGROUND OF THE INVENTION

There exists in the semiconductor and metallurgical industry a need for producing Si or Ge in a pure powdered form. Mixtures of Si and/or Ge and a sulfide compound, which may be a sulfide of Ge or Si, are produced, for example, as by-products in certain processes employed for the manufacture of semiconductor materials for use in electrical components.

For example, Sirtl et al., U.S. Pat. No. 3,290,181, teach a method of transporting and depositing substantially pure semiconductor materials, such as gallium arsenide, germanium, silicon and the like. The method consists of contacting a substantially pure semiconductor material, at a high temperature, with a gaseous mixture of $H_2S$ and hydrogen. The semiconductor material is thereupon converted to a subsulfide compound of the semiconductor element and transported as a vapor to a different location having a temperature at which the subsulfide of the semiconductor material dissociates and the semiconductor material is precipitated as an epitaxial layer.

In another process, defined in U.S. Pat. No. 3,519,492 to Huml et al., semiconductor materials (including Ge and Si) can be prepared of such high purity that they can be employed in the manufacture of electrical components. The semiconductor materials are prepared by contacting a semiconductor source material, defined hereinafter, with a subsulfide forming agent, under an otherwise inert atmosphere which is free of excess hydrogen, at a sufficient temperature to form a gaseous product mixture containing at least gaseous subsulfides of the semiconductor material. The temperature of the gaseous product mixture is then lowered sufficiently below the subsulfide formation temperature, at the pressure being utilized, to dissociate and precipitate purified semiconductor materials.

In both of these processes, a certain quantity of the semiconductor material is lost during the dissociation reaction by side reactions wherein a solid mixture of semiconductor materials, e.g., Ge and/or Si, and a sulfide compound (predominantly the normal valent sulfide of the semiconductor material) is formed. This mixture is usually found in the reactor at a location having a slightly different temperature than the temperature at the location where the precipitation of the pure semiconductor material occurs. The sulfur contaminated products of these processes are not normally considered satisfactory for the production of electrical elements. It has now been discovered that Ge and Si can be separated from a mixture containing one of these elemental materials and a sulfide, e.g., silicon or germanium sulfide, by employing a certain sulfide dissociating reagent which selectively reacts with the sulfide compound to form products which can be readily separated from the mixture.

The present invention has the advantage of producing Ge or Si of such a purity that it can be employed to prepare electrical components. Further the Si and Ge is produced in a very fine powdered form which finds particular utility as a reducing agent such as in the silicothermal reduction of MgO.

SUMMARY OF THE INVENTION

A mixture containing elemental Si or Ge and a sulfide compound is contacted with a sulfide dissociating reagent which is reactive with the sulfide compound in the mixture in preference to Si or Ge at a temperature below the melting point and the subsulfide formation temperature of Ge or Si (depending on which is present) thereby forming at least two distinct phases, comprising solid powdered Si or Ge and a fluid phase, liquid and/or gas, containing sulfide compounds. The powder and fluid phase(s) are separated, e.g., by volatilization, filtration and the like.

The invention also concerns an improvement in the method of producing pure Ge or Si from a source material containing Ge or Si by a subsulfide dissociation method whereby the Ge or Si and sulfide mixture produced in a side reaction is processed as defined directly hereinbefore to prepare powdered Si or Ge of a high degree of purity.

"Sulfide dissociating reagent" as employed herein means a fluid reagent, gas and/or liquid which selectively reacts with sulfide compounds (e.g., Si or Ge sulfide) in preference to Ge or Si to form a fluid reaction product. The reagent should not react with Ge or Si to any appreciable extent. Mixtures of certain solubilizing reagents may also be employed.

"Subsulfide forming agent" as employed herein refers to those materials employed in the process defined in U.S. Pat. No. 3,519,492 to Huml et al. to produce gaseous subsulfides of Ge or Si.

PREFERRED EMBODIMENTS

In the practice of the present invention a mixture comprising Ge or Si and a sulfide compound is contacted with a sulfide dissociating reagent which is a fluid compound having at least one labile hydrogen atom which is reactive with at least a portion of the sulfide compound in said mixture to form gaseous $H_2S$ and/or $HS^-$ ions in solution and/or to form a compound which can be volatilized or solubilized away from the mixture.

Sulfide dissociating reagents having at least one labile hydrogen which are suitable for use in the present invention include for example, certain amines, aqueous mineral acids, alcohols and carboxylic acids. Specific reagents include for example liquid and/or gaseous ammonia, water, methyl alcohol, ethyl alcohol, HCl, HF, acetic acid, methyl amine, $SiH_4$, and mixtures thereof.

As indicated, the dissociatng reagent may be employed as a gas and/or a liquid; this will depend to some extent on the temperature and pressure at which the process is operated and the particular reagent employed.

The reaction is carried out at a temperature which is most effective for readily dissociating the sulfide compound in the mixture. However, as indicated, the operating temperature is below whichever is the lowest of the melting point or subsulfide formation temperature of Ge or Si, whichever is in the mixture, or a loss of product will result. For example, if the initial mixture comprises silicon and silicon disulfide the process must be carried out at a temperature of less than about 1050° C. at normal pressures; above this temperature gaseous SiS forms. Usually a temperature of from about 0° C. to about 500° C. is preferred.

The operating pressure is not critical; for convenience the process is usually carried out at atmospheric pressures. Increased or reduced pressure can be employed. The pressure will affect the other operating conditions such as reaction temperatures, gas volumes and the like.

The initial mixture comprises Ge or Si and a sulfide compound. The process is particularly useful for treating a mixture of Ge or Si and a normal valent sulfide of the element, e.g., Si and $SiS_2$ mixtures. However, other sulfide compounds such as Al and the like can also be removed from such a mixture by employing the principles of the present invention.

The ratio of reactants, initial mixture and the exact sulfide dissociating reagent, is not critical. However, it is necessary to employ at least stoichiometric quantities of the dissociating reagent to effect the most rapid and efficient removal of the sulfide compound from the initial mixture.

Upon reaction with a suitable dissociating reagent at least two distinct phases are formed, i.e., a fluid and a solid phase. These phases can comprise an $H_2S$ gaseous phase and/or $HS^-$ ion containing liquid phase, other gaseous phases, liquid phases containing soluble compounds produced during the reaction along with solid powdered Si or Ge. For example, when a Si and $SiS_2$ mixture is treated with excess water at temperatures up to the temperature of reaction of $SiS_2$ with Si, powdered Si, $H_2S$ and $Si(OH)_4$ are formed. The $H_2S$ is liberated and the powdered Si is separated from the $Si(OH)_4$ solution by filtration or the like.

The powdered Si or Ge which is produced will generally have a particle size of less than about minus 200 mesh U.S. Standard Sieve Series.

The initial reaction (e.g., Si and $SiS_2$) mixture is usually provided in a powdered or granulated form to expedite the removal of the sulfide compound. However, in certain instances a solid form may be treated to produce a porous structure of Si or Ge.

As indicated, the initial reaction mixture may be obtained from a number of different sources. One particular source of the initial mixture is the by-product produced in a side reaction in the process disclosed by Huml et al. in U.S. Pat. No. 3,519,492, referred to hereinbefore. The process disclosed therein comprises contacting a semiconductor source material, including Ge or Si as a semiconductor material, wherein the impurities are characterized in that they do not form gaseous subsulfides or in that they form gaseous subsulfides which are more volatile or which are less volatile than the subsulfides of the semiconductor materials, with a subsulfide forming agent at a temperature sufficient to form a gaseous product mixture containing gaseous subsulfides of at least a portion of the semiconductor material. At least a portion of the gaseous subsulfide compound is dissociated by lowering the temperature thereof. Highly purified semiconductor materials are precipitated, usually onto a prepared substrate.

Mixtures of semiconductor materials (namely Ge or Si) and sulfides of these elements and/or other sulfide compounds, e.g., impurities, are usually deposited in areas having a temperature different from the temperature at which the subsulfide of the semiconductor compound dissociates. The temperature of the gaseous subsulfide compound is lowered, for example, by conducting the gaseous product mixture into a zone having a lower temperature than the gaseous subsulfide formation temperature. Thus, pure semiconductors are produced from a substantially impure semiconductor source material without the need for reducing gases such as hydrogen. The entire process may be conducted at other than atmospheric pressure and for purposes of economy, control of transport rate, and control of precipitation temperature, inert diluent gases may be employed.

In another embodiment of the process taught by Huml et al., a temperature gradient is provided along the length of the reactor where the semiconductor material is to be precipitated. Extremely high purity semiconductor materials are produced in this manner. In this embodiment the gaseous product mixture, containing at least the subsulfides of the semiconductor material, e.g., Ge or Si is passed through the temperature gradient and in contact with a substrate. Less volatile gaseous products precipitate at the highest temperature range; the semiconductor (Ge or Si) is precipitated at a slightly lower temperature and at a different location, and more volatile products, such as for example, mixtures which can be employed herein, precipitate at a lower temperature in the cooler portions of the reactor.

The subsulfide forming agent which is employed in the process taught by Huml et al. when Ge or Si is to be produced consists of a sulfur containing source selected from the group consisting of $H_2S$, S, a metallic sulfide salt, such as, for example, $GeS_2$, $SiS_2$ and mixtures of $H_2S$ or S with one normal valent metallic sulfide salt thereof. It is usually preferred that, when the subsulfide forming agents consists of a normal valent metal sulfide salt, that such salt be a salt of the semiconductor to be produced.

It is taught by Huml et al. that the subsulfide forming agent is preferably employed in an amount at the maximum about equal to that which is stoichiometrically required to form gaseous subsulfides with the single element semiconductors, e.g., Ge or Si.

A single subsulfide forming agent can be used, an admixture of more than one can be employed and/or an inert diluent gas such as, for example, argon, neon, helium, krypton, xenon and mixtures thereof, can be admixed with the agent. The reaction, however, should be conducted under an otherwise inert atmosphere and may be conducted at other than atmospheric pressures.

Ferrosilicon was employed to prepare pure silicon by the process taught by Huml et al. The ferrosilicon contained from about 40 to about 98 percent by weight of silicon. Other source materials can be employed and materials containing at least 1000 parts per million of impurities and usually containing considerably larger amounts of impurities can be employed to prepare semiconductor materials for use in electrical components.

The subsulfide forming agent is usually at least partially regenerated during the dissociation reaction and may be vented from the system or preferably it is recycled to again contact the impure semiconductor source material.

The temperature employed in the Huml et al. process depends on the nature of the semiconductor material and subsulfide forming agent employed therein. The initial temperature is that which is required to form a gaseous subsulfide of at least the semiconductor in the semiconductor source material. For example, when silicon is to be produced a subsulfide formation temperature of greater than about 1000° C. is usually employed. The dissociation temperature is not greater than the subsulfide formation temperature and usually is at least about 10 degrees below the formation temperature.

When a temperature gradient is employed the temperature along the gradient should range from the formation temperature of the gaseous subsulfide to about room temperature. However, if the gaseous subsulfide forming agent is to be recycled, the lowest temperature should be above the volatilization temperature of the agent.

The reactor employed in the Huml et al. process should be constructed of a material which will withstand the temperatures and pressures employed herein and which is substantially nonreactive with the reactants and reaction products. Such materials include, for example, graphite, silica, silicon carbide or the like.

When the present process is used to separate Ge or Si from a mixture of said element and a sulfide compound (e.g., $SiS_2$ or $GeS_2$) formed by employing the process taught in U.S. Pat. No. 3,519,492 it consists of an improved process whereby greater amounts of pure Si or Ge are prepared from substantially impure semiconductor source materials as defined herein.

Mixtures of Si or Ge and a sulfide, other than those produced in the Huml et al. process, can be employed as the initial mixture in the present process. For example, such mixtures can be recovered from the process as defined in Sirtl et al. Other starting materials may also be employed. Furthermore the process as defined in the Huml et al. patent may be adjusted so that a substantial quantity of a Si or Ge and sulfide compound mixture is formed. This can be accomplished by adjusting the dissociation temperature employed therein so that a greater amount of the mixture will be formed upon dissociation of the gaseous subsulfides.

Mixtures to be treated herein are also produced in a number of other ways. For example, SiS can be formed upon the reaction of $FeSi_2$ and FeS; $Al_2Si$ and $Al_2S_3$; or $Al_2S_3$ and $SiO_2$ and Al at elevated temperatures. Upon condensation and dissociation of the SiS at about 500 to 1100° C. a portion of the condensate comprises a solid intimate mixture of Si and $SiS_2$.

The following examples are included to facilitate a more complete understanding of the present invention but it is understood that the invention is not limited to the specific embodiments incorporated therein.

EXAMPLE 1

A quartz tube reactor was arranged in a furnace such that one end could be heated to 1300° C. while a major portion of the tube at the other end could be controlled at temperatures ranging from about 600° C. to 1200° C. Crude Si (99% pure) 89 grams, was placed in the 1300° C. end along with a small diameter quartz gas delivery tube. A vent was provided at the cooler end of the tube to vent gases. The reactor was heated and when the Si reached 1300° C. a flow of $H_2S$ gas was discharged into the tube and over the heated Si metal. The $H_2S$ reacted immediately with the Si producing a mixture of gaseous products. A portion of this gaseous prouct mixture was observed to condense along the interior walls of the quartz reactor which was maintained at a temperature of about 600–1100° C. The remaining gas (presumably $H_2$) was vented and burned. The reaction was allowed to proceed until about one-half of the crude Si was consumed. The flow of $H_2S$ was then stopped and the reactor was cooled to room temperature. The condensate which was deposited in the 600–1100° C. zone was removed. The material was a tan to black, dense solid and weighed about 90 grams (corresponding to 1.5 gram moles of SiS). Analysis by X-ray diffraction indicated that it was a substantially equimolar mixture of $SiS_2$ and Si. It yielded $H_2S$ in moist air. The material was reacted with cold (0° C.) methanol, yielding gaseous $H_2S$ and a slurry containing powdered Si. The reaction was rapid and exothermic. The reaction was continued until $H_2S$ evolution ceased. The resultant slurry was filtered and the residue washed several times with 50° C. methanol, dried and analyzed. X-ray diffraction analysis revealed only Si in the residue material. Emission spectrographic examination revealed Si as the only observable metallic constituent with impurities all less than 0.1% (the limit of this type of analysis). Determination of impurities by spark source mass spectrometry revealed less than 20 p.p.m. total impurity content (the limit of this type of analysis).

EXAMPLE 2

A sample of the equimolar $SiS_2$–Si mixture as prepared in Example 1 was treated with aqueous HF solution. The reaction produced $H_2S$ and $SiF_4$ gases and a residue consisting of fine Si metal powder, approximately 83 percent by weight passing through a 100 mesh screen.

EXAMPLE 3

A sample of the $SiS_2$–Si equimolar mixture prepared as described in Example 1 was reacted with HCl gas in the following way. The reaction was conducted in a quartz tube fitted with an external electric heater and internal atmosphere control equipment. The sample was placed in the tube and heat applied. The portion of the tube containing the sample was heated and the temperature allowed to rise from 150° C. to 450° C. over a 3 hour period while the remainder of the tube was maintained below about 100° C. A mixture of equal volumes of HCl–Ar gas was passed over the sample and the gaseous products were vented from the tube and into a series of cold traps maintained at 0° C. and finally discharged. Products from the experiment consisted of a residual material in the tube and liquid condensate in the cold traps. Analyses of the liquid condensate showed it contained various chlorosilanes. The residue analysis showed a Si to S weight ratio of 2.33. The starting material had a Si to S weight ratio of .875 thus showing a preferential removal of sulfide compounds from the initial mixture. Further treatment with the HCl–Ar gas will yield silicon material of semiconductor purity.

What is claimed is:

1. In the process of producing Si from an impure semiconductor Si source material consisting of contacting an impure source material under an inert atmosphere, with a subsulfide forming agent at a sufficient temperature and pressure to form a gaseous product mixture containing gaseous subsulfides of Si, said impurities in said source material being members selected from the group consisting of nonsubsulfide forming materials or materials forming subsulfides having a volatility different from that of the subsulfides of Si, the subsulfide forming agent is a sulfur containing source consisting of sulfur, $H_2S$, a normal metal sulfide compound, or a mixture of $H_2S$ or S and one normal metal sulfide compound; lowering the temperature of the gaseous product mixture sufficiently to dissociate the gaseous subsulfides and precipitate a mixture containing Si and silicon disulfide, the improvement which comprises:

(a) contacting said mixture with at least one member selected from the group of ethyl or methyl alcohol at a temperature of less than 1050° C. to form at least two distinct phases comprising pure powdered Si and a fluid phase containing sulfide compounds; and (b) separating said phases.

2. The process as defined in claim 1 wherein the subsulfide forming agent is a sulfur containing reagent selected from the group consisting of sulfur, $H_2S$, and a normal valent sulfide compound of Si.

(References on following page)

References Cited

UNITED STATES PATENTS

| | | | |
|---|---|---|---|
| 2,901,325 | 8/1959 | Theuerer | 23—223.5 |
| 3,148,131 | 9/1964 | Coursier et al. | 23—223.5 X |
| 3,436,284 | 4/1969 | Klein | 23—223.5 X |
| 3,503,737 | 3/1970 | Layne et al. | 23—223.5 X |
| 3,519,492 | 7/1970 | Huml et al. | 148—1.6 |

OTHER REFERENCES

J. W. Mellor's "A Comp. Treatise on Inorg. and Theoretical Chem.," vol. 6, 1925, pp. 986–988. Longmans, Green & Co., N.Y.

P. Pascal's "Nouveau Traité de Chimie Minérale," Tome 8, 1965, p. 537. Massen et cie, Editeurs, Paris, France.

H. Remy's "Treatise on Inorg. Chem.," vol. 1, 1956 Ed., p. 485, Elsevier Pub. Co., N.Y.

Nebergall et al. book "College Chemistry," 1968, p. 451. Raytheon Education Co., Boston, Mass.

EDWARD STERN, Primary Examiner

U.S. Cl. X.R.

423—561; 148—1.6